US009785858B2

(12) United States Patent
Seifert et al.

(10) Patent No.: US 9,785,858 B2
(45) Date of Patent: Oct. 10, 2017

(54) METHOD AND SYSTEM FOR HIERARCHICAL PARSING AND SEMANTIC NAVIGATION OF FULL BODY COMPUTED TOMOGRAPHY DATA

(75) Inventors: Sascha Seifert, Königsbach-Stein (DE); Adrian Barbu, Tallahassee, FL (US); Shaohua Kevin Zhou, Plainsboro, NJ (US); David Liu, Plainsboro, NJ (US); Johannes Feulner, Erlangen (DE); Martin Huber, Uttenreuth (DE); Michael Suehling, Plainsboro, NJ (US); Alexander Cavallaro, Utttenreuth (DE); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 2414 days.

(21) Appl. No.: 12/567,197

(22) Filed: Sep. 25, 2009

(65) Prior Publication Data
US 2010/0080434 A1    Apr. 1, 2010

Related U.S. Application Data

(60) Provisional application No. 61/100,351, filed on Sep. 26, 2008.

(51) Int. Cl.
*G06K 9/00* (2006.01)
*G06K 9/46* (2006.01)
*G06T 7/11* (2017.01)
*G06T 7/143* (2017.01)

(52) U.S. Cl.
CPC ............ *G06K 9/4638* (2013.01); *G06T 7/11* (2017.01); *G06T 7/143* (2017.01);
(Continued)

(58) Field of Classification Search
CPC ................................... G06K 2209/05
(Continued)

(56) References Cited

U.S. PATENT DOCUMENTS

| 6,585,647 | B1 * | 7/2003 | Winder | 600/437 |
| 2008/0101676 | A1 | 5/2008 | Zheng et al. | |
| 2008/0262814 | A1 | 10/2008 | Zheng et al. | |
| 2009/0154785 | A1 * | 6/2009 | Lynch | G06T 7/0028 382/131 |

OTHER PUBLICATIONS

"Detection and measurement of fetal anatomies from ultrasound images using a constrained probabilistic boosting tree" IEEE Transactions on Medical Imaging, vol. 27, No. 9, Sep. 2008, pp. 1342-1355.*

(Continued)

*Primary Examiner* — Sheetal R Paulson

(57) ABSTRACT

A method and apparatus for hierarchical parsing and semantic navigation of a full or partial body computed tomography CT scan is disclosed. In particular, organs are segmented and anatomic landmarks are detected in a full or partial body CT volume. One or more predetermined slices of the CT volume are detected. A plurality of anatomic landmarks and organ centers are then detected in the CT volume using a discriminative anatomical network, each detected in a portion of the CT volume constrained by at least one of the detected slices. A plurality of organs, such as heart, liver, kidneys, spleen, bladder, and prostate, are detected in a sense of a bounding box and segmented in the CT volume, detection of each organ bounding box constrained by the detected organ centers and anatomic landmarks. Organ segmentation is via a database-guided segmentation method.

24 Claims, 7 Drawing Sheets

(52) U.S. Cl.
    CPC .................. *G06K 2209/05* (2013.01); *G06T 2207/10081* (2013.01); *G06T 2207/20081* (2013.01); *G06T 2207/20128* (2013.01); *G06T 2207/30048* (2013.01); *G06T 2207/30056* (2013.01)

(58) Field of Classification Search
    USPC ........................................................ 382/128
    See application file for complete search history.

(56) References Cited

OTHER PUBLICATIONS

Tu, Zhuowen, "Probabilistic Boosting Tree: Learning discriminative models for classification, recognition, and clustering." Proceedings of the Tenth IEEE International Conference on Computer Vision, 2005.*

Carneiro et al. Cover Page "Detection and measurement of fetal anatomies from ultrasound images using a constrained probabilistic boosting tree" IEEE Transactions on Medical Imaging, vol. 27, No. 9, Sep. 2008.*

Chien-Cheng, Lee, et al. "Identifying Multiple Abdominal Organs from CT Image Series Using a Multimodule Contextual Neural Network and Spatial Fuzzy Rules." IEEE Transactions on information Technology in Biomedicine, vol. 7, No. 3, Sep. 2003, pp. 208-217.*

Zheng, Y. et al., "Four-Chamber Heart Modeling and Automatic Segmentation for 3D Cardiac CT Volumes Using Marginal Space Learning and Steerable Features", IEEE Transactions on Medical Imaging, 27(11), Nov. 2008.

Ling, H. et al., Hierarchical, Learning-based Automatic Liver Segmentation, CVPR, 2008.

* cited by examiner

METHOD AND SYSTEM FOR HIERARCHICAL PARSING AND SEMANTIC NAVIGATION OF FULL BODY COMPUTED TOMOGRAPHY DATA

This application claims the benefit of U.S. Provisional Application No. 61/100,351, filed Sep. 26, 2008, the disclosure of which is herein incorporated by reference.

BACKGROUND OF THE INVENTION

The present invention relates to image processing of whole body computed tomography (CT) scans, and more particularly, to automated detection of organs and anatomic landmarks in whole body CT scans.

Whole body CT scanning is a common practice for diagnosis of systemic diseases. However, the large amount of data in whole body CT scans makes it difficult for a clinician to efficiently navigate whole body CT data. Accordingly, automatic tools are desirable to support navigation of whole body CT data.

Recently, methods have been developed for segmenting the heart and the liver in CT images, but such methods are organ specific and difficult to transfer to other organs. Most conventional approaches for segmenting multiple structures rely on probabilistic atlases that are registered non-rigidly to an image. Such conventional approaches have the following disadvantages. First, non-rigid registrations cannot handle topological changes in the organ boundaries. Such changes occur when an organ has moved from its usual place or is greatly enlarged due to disease. Accordingly, the conventional approaches are not accurate when abnormalities or disease is present. Second, registration techniques are typically computationally expensive, which can lead to long processing times.

BRIEF SUMMARY OF THE INVENTION

The present invention provides a method for hierarchically parsing whole body computed tomography (CT) volumes and automatically segmenting multiple organs, taking contextual information into account. Embodiments of the present invention provide a framework which automatically segments multiple organs and detects multiple anatomic landmarks in a whole body CT volume efficiently and robustly. New anatomy can be easily incorporated, since the framework can be trained and handles the segmentation of organs and the detection of landmarks in a unified manner. The detected landmarks and segmented organs facilitate semantic navigation inside the body using the whole body CT volume.

In one embodiment, one or more predetermined slices of a full or partial body CT volume are detected. A plurality of anatomic landmarks and organ centers are then detected in the CT volume, each detected in a portion of the CT volume constrained based on at least one of the detected slices. A plurality of organs, such as heart, liver, kidneys, spleen, bladder, and prostate, are segmented in the CT volume based on the detected organ centers and anatomic landmarks.

These and other advantages of the invention will be apparent to those of ordinary skill in the art by reference to the following detailed description and the accompanying drawings.

DETAILED DESCRIPTION

The present invention is directed to a method for detecting anatomic landmarks and segmenting organs in a whole body computed tomography (CT) volume. Embodiments of the present invention are described herein to give a visual understanding of the landmark and organ detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
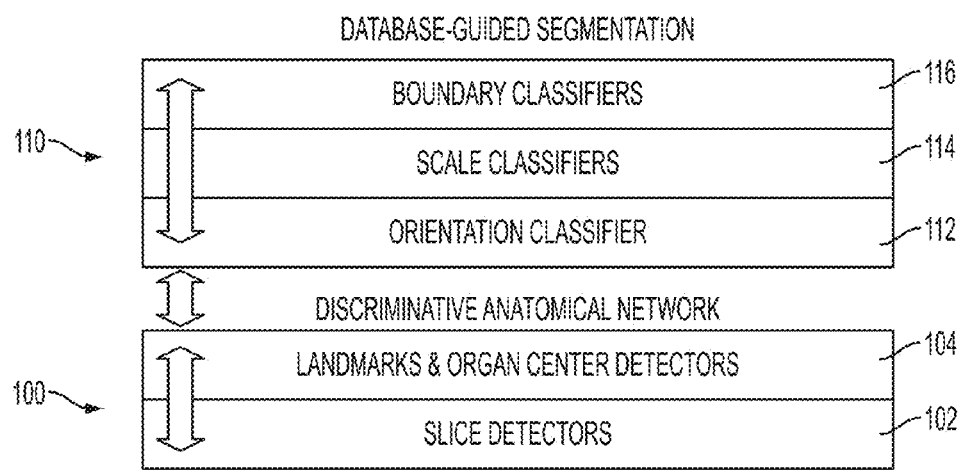
FIG. 1 illustrates an overall architecture for performing automated anatomic landmark detection and organ segmentation according to an embodiment of the present invention.

Embodiments of the present invention are directed to detecting anatomic landmarks and segmenting organs in a whole body CT volume. FIG. 1 illustrates an overall architecture for performing automated anatomic landmark detection and organ segmentation according to an embodiment of the present invention. As illustrated in FIG. 1, the architecture includes two layers: a Discriminative Anatomical Network (DAN) 100 and a database-guided segmentation module 110. The DAN 100 gives an estimate about the scale of the patient and the portion of the volume visible. Furthermore, the DAN 100 detects a set of anatomic landmarks and organ centers for navigating the volume. The DAN 100 includes slice detectors 102 for detecting predetermined slices of an input CT volume and landmark and organ center detectors 104 for detecting positions of various anatomical landmarks and organ centers in the CT volume. All of the slice detectors 102 are connected in the DAN 100 to ensure that the relative positions of the detected slices are correct. The landmark and organ center detectors 104 are connected in the DAN 100 so that the detection of the landmarks and organ centers takes into account the relative positions of the various landmarks and organ centers. According to one embodiment, the slice detectors 102 can be trained based on annotated training data using a probabilistic boosting tree (PBT) and 2D Haar features, and the landmark detectors 104 can be trained based on annotated training data using a PBT and 3D Haar features.

The database-guide segmentation module 110 includes orientation classifiers 112, scale classifiers 114, and boundary classifiers 116 for each organ that is to be segmented. The orientation and scale classifiers 112 and 114 for each organ result in a rough 3D segmentation of each organ by applying marginal space learning (MSL) starting with the detected organ centers. In MSL, organs are detected using a sequence of learned classifiers, starting with a few parameters (e.g., organ position without orientation and scale) and ending with a classifier that models all desired organ parameters (e.g., position, orientation, and scale). Accordingly, the orientation classifier 112 detects candidates for the position and orientation of an organ and the scale classifier 114 detects candidates for a full similarity transformation (position, orientation, and anisotropic scale) of the organ. All of the final candidates are fused to output the estimate of the full similarity transformation. According to the estimated similarity transformation, the mean shape of the organ is warped to yield a rough 3D segmentation of the organ. The boundary classifiers 116 are used to refine the boundaries of the organs resulting from the scale classifiers 114. According to an embodiment of the present invention, the orientation classifiers 112, scale classifiers 114, and boundary classifiers 116 for the organs can be trained based on annotated training data as PBT classifiers using features, such as 2D Haar, 3D Haar, and steerable features. However, the present invention is not limited thereto and other learning methods, such as a Probabilistic Boosting Network (PBN) can be used as well.

Figure 2:
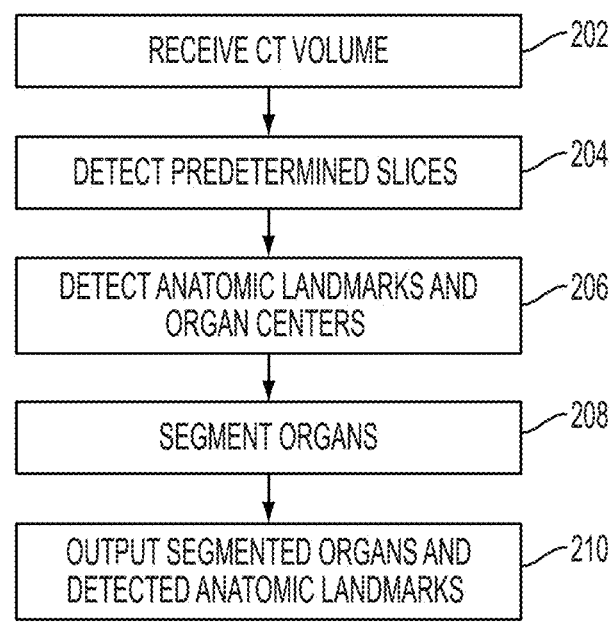
FIG. 2 illustrates a method for detecting anatomic landmarks and segmenting organs in a whole body CT volume according to an embodiment of the present invention.

FIG. 2 illustrates a method for detecting anatomic landmarks and segmenting organs in a whole body CT volume according to an embodiment of the present invention. The method of FIG. 2 transforms CT image data representing anatomy of a patient to detect various anatomical landmarks and organs in the CT image data. At step 202, a CT volume is received. The CT volume can be a full or partial body CT volume received directly from a CT scanning device. It is also possible that the CT volume can be received by loading a full or partial body CT volume that has been previously stored, for example on a memory or storage of a computer system or another computer readable storage medium.

At step 204, a number of predetermined slices are detected in the CT volume. The predetermined slices can be slices selected to give additional anatomical information to help define a search space for various anatomic landmarks. CT and magnetic resonance (MR) full body scans have a natural alignment of the z-axis of the body since the scans are acquired as axial cross-sections (slices). Browsing these slices, it can be seen that some of the axial slices are very salient and can be easily detected. Slice detectors can be trained based on training data to detect certain number of the most salient slices.

In order to determine the most salient slices, the present inventors aligned 44 volumes at 4 mm resolution along the z-axis by the z-location of the lung tips, aortic arch, liver center, right kidney center, and coccyx. 100 slices were then generated from each volume by linear interpolation between the above mentioned alignment positions. Thus, for example, slice 10 corresponds in all 44 volumes to the aortic arch. Slice detectors were trained for each of the 100 slices using PBT and 2D Haar features, with the k-th detector using slice k from all volumes as positive training examples and all other slices at a distance at least 10 from slice k as negative training examples.

An evaluation of the 100 trained slice detectors using 5-fold cross-validation revealed that three slices are the most salient: slice 4—corresponding to the beginning of the lungs, slice 44—corresponding to the beginning of the liver, and slice 93—corresponding to the lumbar region. Accordingly, three slice detectors for these three slices, denoted by $z_0, z_1, z_2$, are trained and used to detect these slices in the received CT volume. The trained slice detector each of the predetermined slices determines a probability, denoted by $p(Z_i=z_i|I)$, that a slice of the CT volume is that predetermined slice. The three slice detectors are connected into a discriminative anatomical network (DAN), which, ensures that the relative positions of the detected are correct. This network can be implemented as a Markov Random Field (MRF) with the energy:

$$E(z_0, z_1, z_2) = \begin{cases} \infty \text{ if } z_1 < z_2 + D_0 \text{ or } z_0 < z_1 + D_0 \text{ or} \\ \text{ if } z_1 = -1 \text{ and } z_0, z_2 \geq 0 \\ -\sum_{i=0}^{2} \log p(Z_i = z_i | I) + (z_0 - z_1 - \mu_{01})^2 / \sigma_{01}^2 + \\ (z_1 - z_2 - \mu\ )^2 / \sigma_{12}^2 \text{ otherwise.} \end{cases}$$

where $D_0$ is a pre-defined threshold, $\mu$ and $\sigma$ are mean and standard deviation of the according random variable, respectively.

For inference, slices $z_0$ and $z_1$ are restricted to have two values: −1 when the slice does not exist and the location that maximizes the probability $p(Z_i=z_i|I)$. The last slice $z_2$ is found to minimize the energy $E(z_0,z_1,z_2)$. Training the MRF parameters is an optimization procedure based on simulated annealing to minimize the misclassification error.

Figure 3:
FIG. 3 illustrates exemplary slices detected in a full body CT volume.

FIG. 3 illustrates exemplary slices detected in a full body CT volume. As illustrated in FIG. 3, image (a) shows a slice 300 (cross-section) of a CT corresponding the beginning of the lungs, image (b) shows a slice 302 corresponding to the beginning of the liver, and image (c) shows a slice 304 corresponding to the lumbar region. These slices 300, 302, and 304 are detected using trained slice detectors connected in a DAN as described above. In each slice 300, 302, and 304, a bounding box around the body is found by thresholding and pixel-counting operations.

Returning to FIG. 2, at step 206, anatomic landmarks and organ centers are detected in the whole body CT volume. The anatomic landmarks and organ centers are detected using trained landmark and organ center detectors connected in a DAN. The anatomic landmarks can serve various purposes. First, some landmarks have clinical importance (e.g., aortic bend) and help clinicians find valuable information about a patient. Second, some landmarks are very salient and can be robustly detected, thus helping to improve the method's robustness through the anatomical network. Third, 1D landmarks and the detected slices help speed up the detection process by serving as reference points for where to search for other landmarks. Integrating the 1D landmarks results in a speedup of about two orders of magnitude in detecting all of the landmark and organ centers.

The landmarks and the organ centers are 3D points and are treated the same way in this step. For convenience, the anatomic landmarks and organ centers may be referred to together as "landmarks". The landmarks detectors can be trained based on training data using PBT and 3D Haar features. Furthermore, each landmark is associated with one of the three detected slices. If the slices are reported as present, each landmark detector associated with the slice is constrained to a search range relative to the slice location. Such search ranges are approximately 300 times smaller than the full body CT volume, hence a speedup of approximately two orders of magnitude may be obtained.

According to an embodiment of the present invention, organ centers of the heart liver, both kidneys, spleen, bladder, and prostate, can be detected, as well as the following 19 landmarks: left and right lung tips, left and right humerus heads, bronchial bifurcation, left and right shoulder blade tips, inner left and right clavicle tips, sternum tip bottom, aortic arch, left and right endpoints of rib 11, bottom front and back of L5 vertebra, coccyx, pubica symphysis top, and left and right corners of the hip bone. Individual detectors are trained for each of the organ centers and anatomic landmarks, and each detector is used to search a constrained space based on the detected slices the respective landmark.

In order to obtain fast and robust landmark detection, the landmarks (including the organ centers) are connected in graph (network). Information regarding the location of each landmark is propagated across the edges of the graph, which not only speeds up detection, but also increases detection accuracy. This is because the edges encode geometric relationships, such as "to the right of", "close to", etc., and thus constrain the search problem into a smaller domain.

The landmark detectors can be denoted by $\phi_i(x_i|V)$, where random variables $x_i$, i=1, . . . , N, denote the unknown position, scale, and orientation parameters of the N landmarks, depending on the input volume V. The landmark detectors are incorporated into the DAN through an MRF as follows:

$$P(x_1, \ldots, x_N) = \frac{1}{Z} \prod_i \phi_i(x_i | V) \prod_{(i,j) \in E} \psi_{ij}(x_i, x_j)$$

where E denotes the set of edges in the network between landmarks, and $\psi_{ij}(x_i,x_j)$ expresses the pairwise geometric relationship between landmarks. Accordingly, the landmark detection is a network optimization problem based on the landmark detector probabilities and the pairwise geometric relationship between the landmarks. According to an advantageous implementation, the well known Belief Propagation algorithm can be used to find the optimal configuration of landmarks. Based on the Belief Propagation algorithm, the marginal distribution of $x_i$ is $P(x_i) \propto \phi_i(x_i|y_i) \Pi j \in E(i) m_{ji}(x_i)$, where E(i) contains the neighbors of landmark i in the network, and $m_{ij}(.)$ is calculated iteratively according to the schedule:

$$m_{ij}(x_j) = \sum_{x_i} \left( \phi_i(x_i | y_i) \psi_{ij}(x_i, x_j) \prod_{k \in E(i) \setminus j} m_{ki}(x_i) \right)$$

Figure 4:
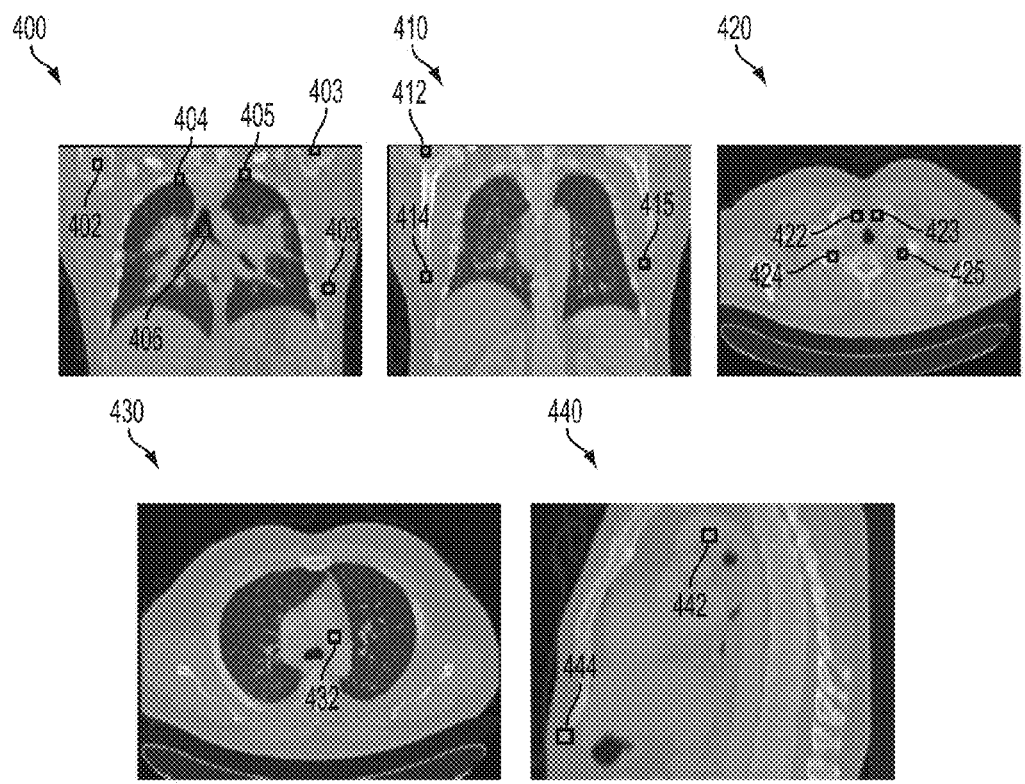
FIG. 4 illustrates exemplary anatomic landmark detection results.
Figure 5:
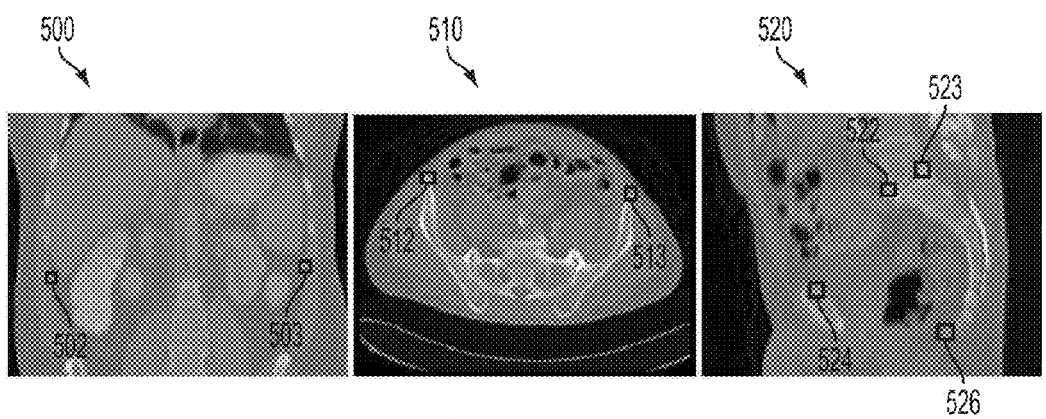
FIG. 5 illustrates exemplary anatomic landmark detection results.

FIGS. 4 and 5 illustrate exemplary anatomic landmark detection results. As illustrated in FIG. 4, images 400, 410, 420, 430, and 440 show detected anatomic landmarks in the thoracic region. Image 400 shows the humerus heads 402 and 403, lung tips 404 and 405, bronchial bifurcation 406, and left shoulder blade tip 408. Image 410 shows the right humerus head 412 and the shoulder blade tips 414 and 415. Image 420 shows the clavicle tips 422 and 423 and the lung tips 424 and 425. Image 430 shows the aortic arch 432. Image 440 shows the aortic arch 442 and the sternum tip 444. As illustrated in FIG. 5, images 500, 510, and 520 show detected anatomic landmarks in the abdominal region. Image 500 shows the endpoints of rib 11 502 and 503. Image 510 shows the hipbone tips front 512 and 513. Image 520 shows the L5 vertebra endplate border 522 and 523, pubica symphysis 524, and coccyx 526.

Returning to FIG. 2, at step 208, the organs are segmented in the CT volume using database-guided segmentation based on the detected organ centers and the anatomic landmarks. For each organ, the organ segmentation includes detecting a position, orientation, and scale of the organ using trained object detectors and shape refinement of the organ using trained boundary detectors. According to an embodiment of the present invention, the following seven organs are automatically segmented in a full body CT volume: heart, liver, both kidneys, spleen, bladder, and prostate. For improved performance, the object detection for each organ can be performed on a lower resolution optimized for each specific organ, e.g. 6 mm for the liver, 6 mm for the kidneys, 3 mm for the bladder. The boundary refinement is performed on the original high resolution volume to obtain a more accurate delineation. For organs with a large shape variability, such as the liver or the spleen, the refinement may be performed hierarchically, i.e., the result of the first delineation on a coarse resolution is taken as an input for the refinement on the high resolution volume. Therefore, a pyramid is generated and shared by the DAN and all organ segmenters to manage the different resolution volumes used during the parsing.

Each organ is detected in a sense of a bounding box and segmented in the CT volume. The detection of each organ bounding box is constrained by the detected organ centers and anatomic landmarks. An integrated object detector for each organ detects the position $x=(x_1,x_2,x_3)$, orientation $\theta=(\theta_1,\theta_2,\theta_3)$, and scale $s=(s_1,s_2,s_3)$ of the organ. The problem can be formulated as:

$$(\hat{x},\hat{\theta},\hat{s})=\arg\max p(x,\theta,s|V). \quad (1)$$

Instead of searching in 9D space, embodiments of the present invention utilize an inference scheme, Marginal Space Learning (MSL), which reduces the size of the searching space by marginal space inference and sequentially propagates the whole space:

$$p(x,\theta,s|V)=p(x|V)p(\theta|x,V)p(s|x,\theta,V). \quad (2)$$

Accordingly, to detect a particular organ, top candidates from the organ center detector are kept as position candidates. Position-orientation hypotheses are generated from the position candidates and an orientation classifier detects the best position-orientation candidates from the position-orientation hypotheses. Full similarity transformation hypotheses (position-orientation-scale) are generated from the position-orientation candidates, and a scale classifier detects the best full similarity transformation. A mean shape of the organ generated based on a database of annotated training data is then registered to the volume using the detect similarity transformation to generate an initial segmentation result for the organ.

In order to improve performance of the organ detectors, the detectors can take into account contextual information from the discriminative anatomical network (DAN). Thus, according to an embodiment of the present invention, Equation (2) can be extended with the prior probability:

$$p(x | \{\phi_k\}) = \prod_k p(x | \phi_k)$$

given a set of landmark detectors $\{\phi_k\}$ specific for each organ:

$$p(x,\theta,s|V)=p(x|\{\phi_k\})p(x|V)p(\theta|x,V)p(s|x,\theta,V). \quad (3)$$

A unified probability can be assumed for the prior and the following landmark-organ relationships can be used:
1. Heart: The aortic root landmark is the junction between the left ventricle and the aortic arch which is the closest landmark to geometrical center of the heart. This landmark is quite stable and reliable to server as a prior for heart detection
2. Liver. The liver dome is the maximal point directing into the right lung. The high contrast at the border of the lung facilitates the detection of the liver dome.
3. Kidneys: The renal hilum of the kidney is the recessed central fissure which transmits the vessels, nerves, and ureter. It is a highly discriminative anatomical structure and therefore appropriate for use as a prior for the kidney detection.
4. Spleen: Although there may not be a discriminant relevant landmark in the vicinity of the spleen, the liver slice gives a good estimate of the upper border of the spleen.
5. Bladder and Prostate: The pubica symphysis is a bony highly discriminant structure, close to the bladder and prostate, which makes it a proper prior for the bladder and prostate detection.

Figure 6:
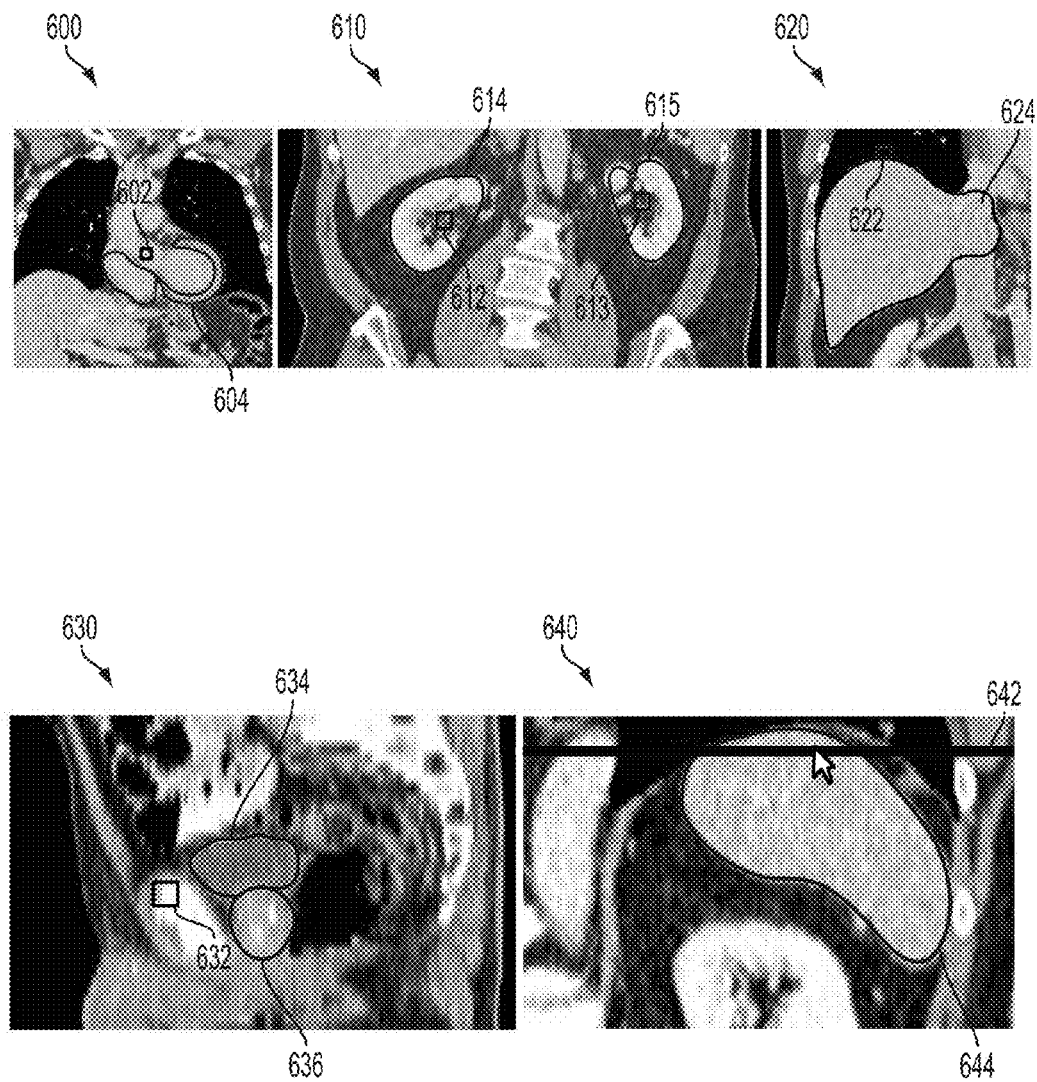
FIG. 6 illustrates exemplary landmark organ relationships.

FIG. 6 illustrates exemplary landmark organ relationships. Image 600 shows the relationship between the aortic root 602 and the heart 604. Image 610 shows the relationship between the kidney hilum 612 and 613 and the kidneys 614 and 615. Image 620 shows the relationship between the liver dome 622 and the liver 624. Image 630 shows the relationship between the pubica symphysis 632, and the bladder 634 and the prostate 636. Image 640 shows the relationship between the liver slice 642 and the spleen 646.

Once the boundary of each organ is detected, each organ boundary is then further refined. The boundary refinement utilizes a trained boundary model (boundary classifier) and a principle component analysis (PCA) shape model. The shape model is hierarchical and is built by recursively applying a downsampling process.

The shape refinement is sequentially performed for each organ and may differ in number of iterations and mesh pyramid levels with different organs. The shape of the organ is represented by the closed triangle mesh $M_{Organ}(P,T)$, where $P=\{p_i \epsilon IR^3\}_{i=1}^{n}$ is the set of n mesh points, and $T=\{t_i \epsilon IZ_+^3\}_{i=1}^{m}$ is the set of m triangle indices. The meshes are built using a canonical mapping from the organ surface to a unit sphere. The shape of the organs is described using a parametrical formulation $S(\theta,\phi):[0,\pi)\times[-\pi/2,\pi/2]\rightarrow IR^3$, which allows S to be sampled in the space of spherical coordinates $(\theta,\phi)$, which results in a dense mesh. Practically, S can be cut into slices and uniformly sampled along each slice to generate P. These reference meshes provide point correspondence for training based on a database of training data to build a mean shape $M'_{Organ}$ and shape space.

For each individual organ, the hierarchical mesh refinement works as follows. The mesh $M_{Organ}$ is initialized with the mean shape $M'_{Organ}$, aligned in the CT volume using the similarity transformation $x,\theta,s$ resulting from the organ detection. The number of mesh points is optimized with regards to the dimensions and the shape variability of the organ. The boundary classifier is then used to move every point $p_i$ of $M_{Organ}$ to an optimal position where the estimated boundary probability is maximized. One advantage of learning based boundary detection is its robustness for highly heterogeneous backgrounds. To avoid an unnatural shape for the organ, the adjusted mesh $M_{Organ}$ is projected onto a shape subspace. The mesh is then upsampled using thin plate splines (TPS) to generate a finer mesh with the number of points doubled for the next refinement iteration. These steps are repeated a certain number of times as defined for each organ. In the last iteration, instead of upsampling the mesh using TPS, the resulting dense mesh $M_{Organ}$ is smoothed using a windowed sinc function interpolation kernel. The effect of this smoothing is to relax the mesh, making the shape of the cells more regular and the vertices more evenly distributed. This results in a final segmentation result for each organ.

At step 210, the organ segmentation results and anatomic landmark detection results are output. The detection and segmentation results can be output by displaying the detection and segmentation results on a display of a computer system. The anatomical landmark detection and organ segmentation results can also be output by storing the detection results, for example, on a memory or storage of a computer system or on a computer readable storage medium. The output segmented organs and detected anatomic landmarks can be used for semantic navigation of the full body CT volume.

Figure 7:
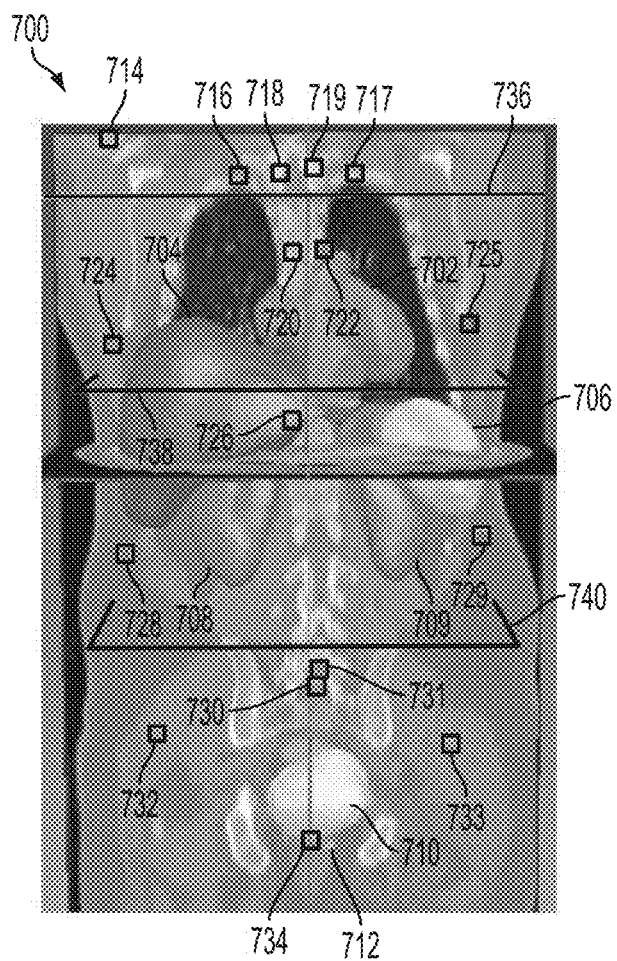
FIG. 7 illustrates exemplary organ segmentation and anatomic landmark detection results in a full body CT volume.

FIG. 7 illustrates exemplary organ segmentation and anatomic landmark detection results in a full body CT volume. As illustrated in FIG. 7, image 700 shows the segmentation results for the following organs: heart 702, liver 704, spleen 706, kidneys 708 and 709, bladder 710, and prostate 712. Image 700 also shows the detection results for the following anatomic landmarks: left humerus head 714, lung tips 716 and 717, clavicle tips 718 and 719, bronchial bifurcation 720, aortic arch 722, should blade tips 724 and 725, sternum tip 726, endpoints of rib 11 728 and 729, L5 vertebra endplate 730 and 731, hip bone tips 732 and 733, and pubica symphysis 734. Image 700 also shows the detected slices 736, 738, and 740 corresponding to the beginning of the lung, the beginning of the liver, and the lumbar region, respectively.

Figure 8:
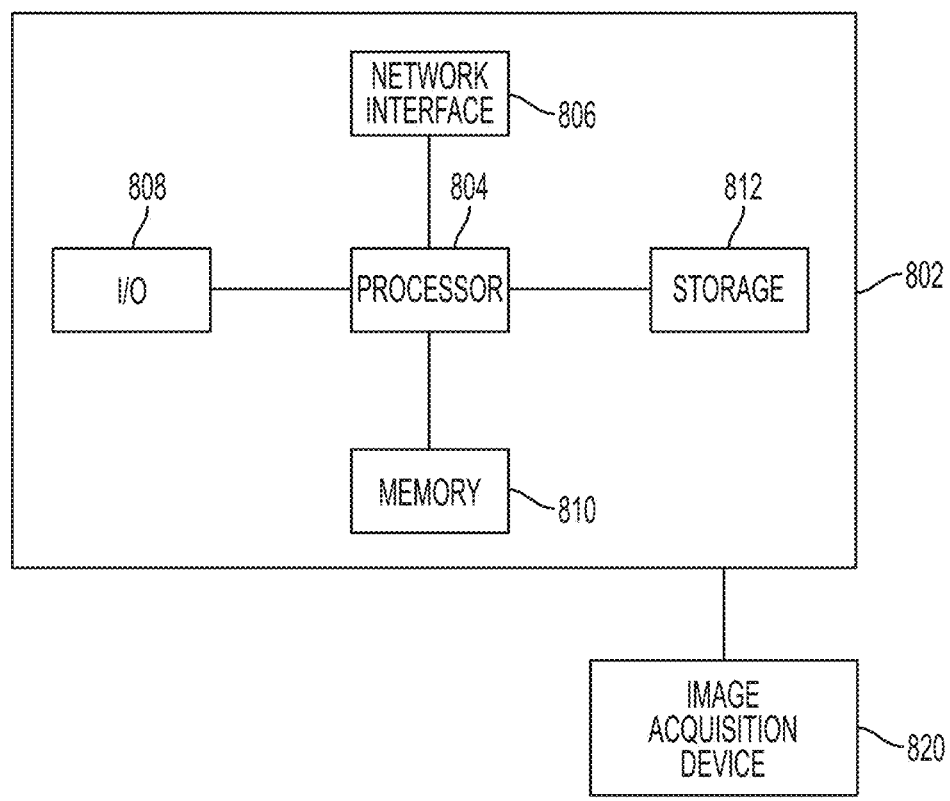
FIG. 8 is a high level block diagram of a computer capable of implementing the present invention.

The above-described methods for anatomical landmark detection and organ segmentation may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812 (e.g., magnetic disk) and loaded into memory 810 when execution of the computer program instructions is desired. Thus, the steps of the method of FIG. 2 may be defined by the computer program instructions stored in the memory 810 and/or storage 812 and controlled by the processor 804 executing the computer program instructions. An image acquisition device 820, such as an CT scanning device, can be connected to the computer 802 to input the 3D images (volumes) to the computer 802. It is possible to implement the image acquisition device 820 and the computer 802 as one device. It is also possible that the image acquisition device 820 and the computer 802 communicate wiredly or wirelessly through a network. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting anatomic landmarks and segmenting organs in a full or partial body computed tomography (CT) volume, comprising:
   detecting one or more predetermined slices of the CT volume, wherein detecting one or more predetermined slices of the CT volume comprises:
      detecting candidates for the predetermined slices using trained slice detectors, and
      estimating a final slice position for each of the predetermined slices based on inter-slice geometric relationships using a discriminative anatomical network (DAN) that connects the trained slice detectors;
   detecting a plurality of anatomic landmarks and organ centers in the CT volume, wherein each of the plurality of anatomic landmarks and organ centers is detected in a portion of the CT volume constrained based on one of the detected one or more predetermined slices; and
   segmenting a plurality of organs in the CT volume based on the detected organ centers and the detected anatomic landmarks.

2. The method of claim 1, wherein the trained slice detectors are trained based on training images using a probabilistic boosting tree (PBT) and 2D Haar features.

3. The method of claim 1, wherein said step of detecting one or more predetermined slices of the CT volume comprises:
   detecting a first slice corresponding to a beginning of the lungs in the CT volume;
   detecting a second slice corresponding to a beginning of the liver in the CT volume; and
   detecting a third slice corresponding to a lumbar region in the CT volume.

4. The method of claim 1, wherein said step of detecting a plurality of anatomic landmarks and organ centers in the CT volume comprises:
   detecting the plurality of anatomic landmarks and organ centers using trained landmark detectors connected in a discriminative anatomic network (DAN).

5. The method of claim 4, wherein the trained landmark detectors are trained based on training images using a probabilistic boosting tree (PBT) and 3D Haar features.

6. The method of claim 4, wherein said step of detecting the plurality of anatomic landmarks and organ centers using trained landmark detectors connected in a DAN comprises:
   detecting a configuration of positions of all of the plurality of anatomic landmarks and organ centers in the CT volume based on probabilities determined by each of the trained landmark detectors and pairwise geometric relationships between the anatomic landmarks and organ centers.

7. The method of claim 1, wherein said step of segmenting a plurality of organs in the CT volume based on the detected organ centers and the detected anatomic landmarks comprises:
   detecting a boundary for each of the plurality of organs using marginal space learning (MSL); and
   refining the detected boundary for each of the plurality of organs using a trained boundary classifier.

8. The method of claim 7, wherein said step of detecting a boundary for each of the plurality of organs using MSL comprises:
   detecting position candidates for each organ based on the detected organ center for each organ and at least one detected anatomic landmark having a predefined relationship to each organ;
   detecting position-orientation candidates based on the detected position candidates for each organ using a trained orientation classifier;
   detecting a full similarity transformation for each organ based on the detected position-orientation candidates using a trained scale classifier; and
   aligning a trained mean shape of each organ to the CT volume using the detected full similarity transformation for each organ.

9. The method of claim 8, wherein each of the trained orientation and scale classifiers are trained based on training data using a probabilistic boosting tree (PBT) and at least one of 3D Haar features and steerable features.

10. The method of claim 7, wherein said step of refining the detected boundary for each of the plurality of organs using a trained boundary classifier comprises:
   (a) adjusting points on the detected boundary for each of organ using the trained boundary classifier;
   (b) projecting the boundary for each organ onto a shape subspace;
   (c) upsampling the boundary for each organ using thin plate splines (TPS) to double the number of points on the boundary for each organ;
   (d) repeating steps (a)-(c) a particular number of times for each organ; and
   (e) smoothing the boundary for each organ using a windowed sinc function interpolation kernel.

11. The method of claim 1, wherein the plurality of organs comprises heart, liver, spleen, kidneys, prostate, and bladder.

12. The method of claim 1, wherein the plurality of anatomic landmarks comprises left and right lung tips, left and right humerus heads, bronchial bifurcation, left and right shoulder blade tips, inner left and right clavicle tips, sternum tip bottom, aortic arch, left and right endpoints of rib 11, bottom front and back of L5 vertebra, coccyx, pubica symphysis, and left and right corners of the hip bone.

13. An apparatus for detecting anatomic landmarks and segmenting organs in a full or partial body computed tomography (CT) volume, comprising:
   means for detecting one or more predetermined slices of the CT volume, wherein said means for detecting one or more predetermined slices of the CT volume comprises:
      means for detecting the predetermined slices using trained slice detectors connected in a discriminative anatomical network (DAN);
   means for detecting a plurality of anatomic landmarks and organ centers in the CT volume, wherein each of the plurality of anatomic landmarks and organ centers is detected in a portion of the CT volume constrained based on one of the detected one or more predetermined slices; and
   means for segmenting a plurality of organs in the CT volume based on the detected organ centers and the detected anatomic landmarks.

14. The apparatus of claim 13, wherein said means for detecting one or more predetermined slices of the CT volume comprises:
   means for detecting a first slice corresponding to a beginning of the lungs in the CT volume;

means for detecting a second slice corresponding to a beginning of the liver in the CT volume; and means for detecting a third slice corresponding to a lumbar region in the CT volume.

15. The apparatus of claim 13, wherein said means for detecting a plurality of anatomic landmarks and organ centers in the CT volume comprises:

means for detecting the plurality of anatomic landmarks and organ centers using trained landmark detectors connected in a discriminative anatomic network (DAN).

16. The apparatus of claim 13, wherein said means for segmenting a plurality of organs in the CT volume based on the detected organ centers and the detected anatomic landmarks comprises:

means for detecting a boundary for each of the plurality of organs using marginal space learning (MSL); and means for refining the detected boundary for each of the plurality of organs using a trained boundary classifier.

17. The apparatus of claim 16, wherein said means for detecting a boundary for each of the plurality of organs using MSL comprises:

means for detecting position candidates for each organ based on the detected organ center for each organ and at least one detected anatomic landmark having a predefined relationship to each organ;

means for detecting position-orientation candidates based on the detected position candidates for each organ using a trained orientation classifier;

means for detecting a full similarity transformation for each organ based on the detected position-orientation candidates using a trained scale classifier; and means for aligning a trained mean shape of each organ to the CT volume using the detected full similarity transformation for each organ.

18. The apparatus of claim 16, wherein said means for refining the detected boundary for each of the plurality of organs using a trained boundary classifier comprises:

means for adjusting points on the detected boundary for each of organ using the trained boundary classifier;

means for projecting the boundary for each organ onto a shape subspace;

means for upsampling the boundary for each organ using thin plate splines (TPS) to double the number of points on the boundary for each organ; and means for smoothing the boundary for each organ using a windowed sinc function interpolation kernel.

19. A non-transitory computer readable medium encoded with computer executable instructions for detecting anatomic landmarks and segmenting organs in a full or partial body computed tomography (CT) volume, the computer executable instructions defining steps comprising:

detecting one or more predetermined slices of the CT volume;

detecting a plurality of anatomic landmarks and organ centers in the CT volume, wherein each of the plurality of anatomic landmarks and organ centers is detected in a portion of the CT volume constrained based on one of the detected one or more predetermined slices; and segmenting a plurality of organs in the CT volume based on the detected organ centers and the detected anatomic landmarks, wherein the computer executable instructions defining the step of detecting one or more predetermined slices of the CT volume comprise computer executable instructions defining the step of:

detecting the predetermined slices using trained slice detectors connected in a discriminative anatomical network (DAN).

20. The non-transitory computer readable medium of claim 19, wherein the computer executable instructions defining the step of detecting one or more predetermined slices of the CT volume comprise computer executable instructions defining the steps of:

detecting a first slice corresponding to a beginning of the lungs in the CT volume;

detecting a second slice corresponding to a beginning of the liver in the CT volume; and detecting a third slice corresponding to a lumbar region in the CT volume.

21. The non-transitory computer readable medium of claim 19, wherein the computer executable instructions defining the step of detecting a plurality of anatomic landmarks and organ centers in the CT volume comprise computer executable instructions defining the step of:

detecting the plurality of anatomic landmarks and organ centers using trained landmark detectors connected in a discriminative anatomic network (DAN).

22. The non-transitory computer readable medium of claim 19, wherein the computer executable instructions defining the step of segmenting a plurality of organs in the CT volume based on the detected organ centers and the detected anatomic landmarks comprise computer executable instructions defining the steps of:

detecting a boundary for each of the plurality of organs using marginal space learning (MSL); and refining the detected boundary for each of the plurality of organs using a trained boundary classifier.

23. The non-transitory computer readable medium of claim 22, wherein the computer executable instructions defining the step of detecting a boundary for each of the plurality of organs using MSL comprise computer executable instructions defining the steps of:

detecting position candidates for each organ based on the detected organ center for each organ and at least one detected anatomic landmark having a predefined relationship to each organ;

detecting position-orientation candidates based on the detected position candidates for each organ using a trained orientation classifier;

detecting a full similarity transformation for each organ based on the detected position-orientation candidates using a trained scale classifier; and aligning a trained mean shape of each organ to the CT volume using the detected full similarity transformation for each organ.

24. The non-transitory computer readable medium of claim 22, wherein the computer executable instructions defining the step of refining the detected boundary for each of the plurality of organs using a trained boundary classifier comprise computer executable instructions defining the step of:

(a) adjusting points on the detected boundary for each of organ using the trained boundary classifier;

(b) projecting the boundary for each organ onto a shape subspace;

(c) upsampling the boundary for each organ using thin plate splines (TPS) to double the number of points on the boundary for each organ;

(d) repeating steps (a)-(c) a particular number of times for each organ; and (e) smoothing the boundary for each organ using a windowed sinc function interpolation kernel.

* * * * *